United States Patent
Reeves et al.

(10) Patent No.: US 9,560,524 B1
(45) Date of Patent: Jan. 31, 2017

(54) WIRELESS NETWORK APPLICATION ACCESS BY A WIRELESS COMMUNICATION DEVICE VIA AN UNTRUSTED ACCESS NODE

(71) Applicant: Sprint Communications Company L.P., Overland Park, KS (US)

(72) Inventors: Raymond Emilio Reeves, Oviedo, FL (US); Mark Douglas Peden, Olathe, KS (US); Gary Duane Koller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 227 days.

(21) Appl. No.: 14/095,686

(22) Filed: Dec. 3, 2013

(51) Int. Cl.
   *H04L 9/32* (2006.01)
   *H04W 12/06* (2009.01)

(52) U.S. Cl.
   CPC .................... *H04W 12/06* (2013.01)

(58) Field of Classification Search
   CPC ...... H04W 8/183; H04W 12/08; H04W 88/02; H04W 12/06; H04W 88/06; H04W 88/08; H04L 63/0815; H04L 63/08; H04L 63/164; G06F 21/64
   See application file for complete search history.

(56) References Cited

U.S. PATENT DOCUMENTS

| | | | |
|---|---|---|---|
| 7,849,213 B1 * | 12/2010 | Borghetti | H04L 51/12 707/609 |
| 8,274,979 B2 | 9/2012 | Bragagnini et al. | |
| 8,363,658 B1 | 1/2013 | Delker et al. | |
| 2005/0020308 A1 * | 1/2005 | Lai | H04W 8/183 455/558 |
| 2010/0048191 A1 * | 2/2010 | Bender | H04M 3/42382 455/416 |
| 2012/0243517 A1 | 9/2012 | Aguirre et al. | |
| 2012/0264402 A1 * | 10/2012 | Zhang | H04L 63/0815 455/411 |
| 2013/0007868 A1 * | 1/2013 | Hoggan | H04L 9/3263 726/8 |
| 2013/0121322 A1 | 5/2013 | Salkintzis | |

FOREIGN PATENT DOCUMENTS

| | | |
|---|---|---|
| EP | 1334430 | 4/2002 |
| WO | 0227997 | 4/2002 |

* cited by examiner

*Primary Examiner* — Mohammad W Reza
*Assistant Examiner* — Carlton Johnson

(57) ABSTRACT

Embodiments disclosed herein provide systems and methods to provide wireless network application access to a wireless device via an untrusted access node. In a particular embodiment, a method provides receiving communications directed to an application system within a wireless communication network from a wireless communication device via a wireless access node external to the wireless communication network. The method further provides determining whether the communications are authorized for the application system based on a signature included in the communications, wherein the signature comprises a unique identifier generated at the wireless communication device that corresponds to an identity of the wireless communication device and an identity of an integrated circuit within that wireless communication device that is associated with a subscriber of the wireless communication network. Upon determining that the communications are authorized, the method provides transferring the communications to the application system.

16 Claims, 9 Drawing Sheets

100

WIRELESS NETWORK APPLICATION ACCESS BY A WIRELESS COMMUNICATION DEVICE VIA AN UNTRUSTED ACCESS NODE

TECHNICAL BACKGROUND

Wireless communication networks provide application services to wireless communication devices, such as voicemail, messaging, media, or any other type of service that may be provided to a wireless device. When a wireless device is connected through an access node of a particular wide area wireless network, such as a cellular communication network, the wireless network uses authentication procedures to determine whether the wireless device is allowed to access the network. Accordingly, a system within the wireless network that provides an application service may rely on the authentication procedures to ensure the wireless device is allowed to access the application service.

To conserve wireless resources on the wide area wireless network, the wireless device may use other wireless networks, such as WIFI networks, for wireless connectivity. While the use of a WIFI network may have its benefits, a WIFI access node does not use the same procedures as the wide area wireless network to authenticate the wireless device. Therefore, if the wireless device attempts to access the application service via the WIFI access node, the system that provides the application service cannot rely on the authentication procedures to ensure the wireless device is allowed to access the application service.

OVERVIEW

Embodiments disclosed herein provide systems and methods to provide wireless network application access to a wireless device via an untrusted access node. In a particular embodiment, a method provides receiving communications directed to an application system within a wireless communication network from a wireless communication device via a wireless access node external to the wireless communication network. The method further provides determining whether the communications are authorized for the application system based on a signature included in the communications, wherein the signature comprises a unique identifier generated at the wireless communication device that corresponds to an identity of the wireless communication device and an identity of an integrated circuit within that wireless communication device that is associated with a subscriber of the wireless communication network. Upon determining that the communications are authorized, the method provides transferring the communications to the application system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
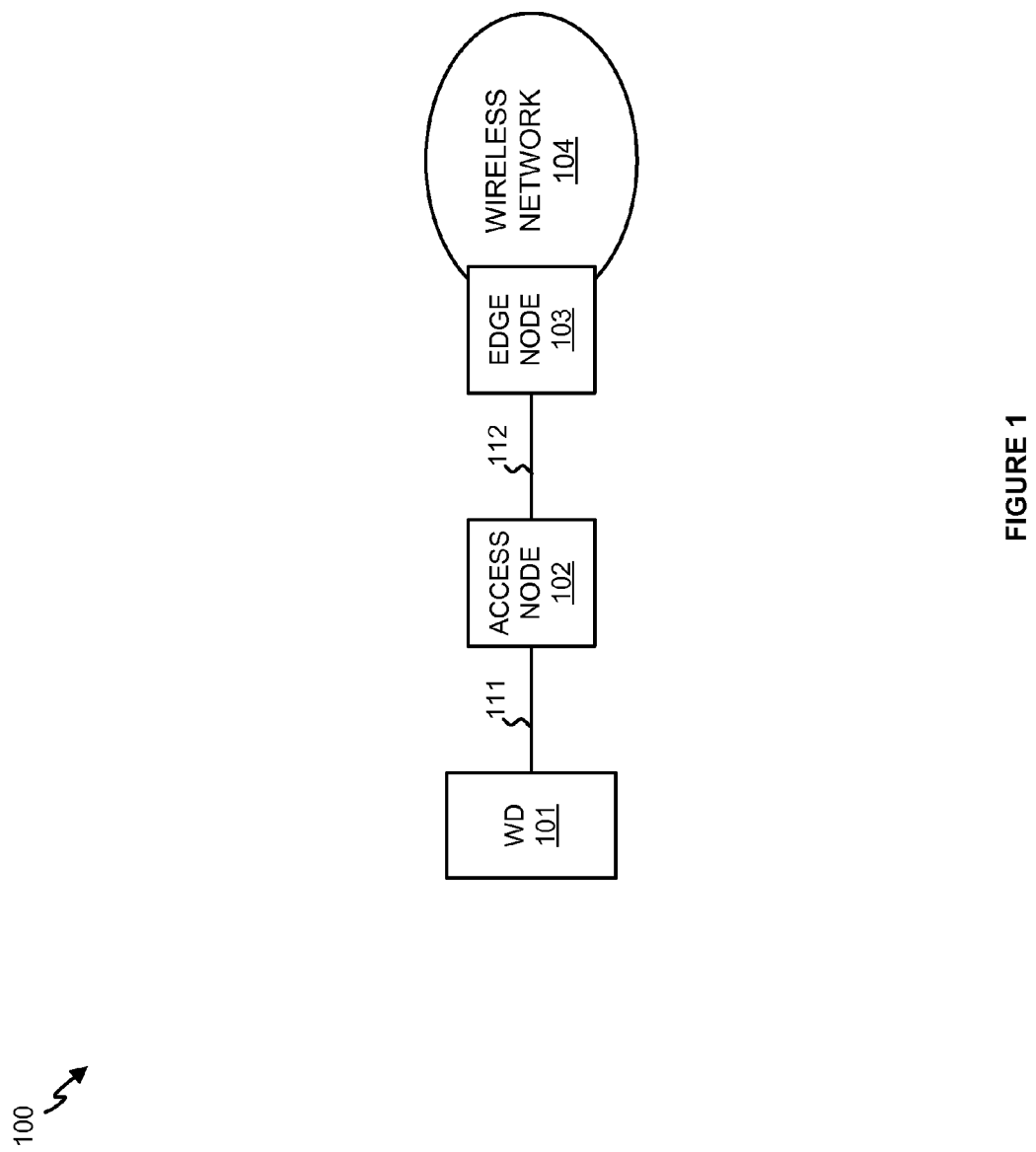
FIG. 1 illustrates a wireless communication system for providing wireless network application access to a wireless device via an untrusted access node.

FIG. 1 illustrates wireless communication system 100. Wireless communication system 100 includes wireless communication device 101, wireless access node 102, and edge node 103, which is included in wireless communication network 104. Wireless communication device 101 and wireless access node 102 communicate over wireless link 111. Wireless access node 102 and edge node 103 communicate over communication link 112.

In operation, wireless network 104 is a wide area wireless network that provides application services to wireless communication devices. These application services may include the provision of voicemail, messaging, media, social networking, or some other type of application service. For example, wireless network 104 may provide a streaming video service to wireless devices. Thus, wireless device 101 may execute an application thereon for accessing the streaming video service from wireless network 104 and presenting the streaming video service to a user of wireless device 101.

Access node 102 is not an access node associated with wireless network 104, which is providing application services. Accordingly, wireless devices communicating with wireless network 104 through access node 102 are not authenticated in the same way wireless devices are authenticated when accessing wireless network 104 through an access node associated with wireless network 104. As a consequence, if wireless device 101 uses access node 102 in an attempt to access an application provided by wireless network 104, wireless network 104 is unable to rely on wireless device 101 having already been authenticated to access wireless network 104. In other words, access node 102 is an untrusted access node to wireless network 104 and communications transferred to wireless network 104 through access node 102 may not be authenticated for access to wireless network 104.

Figure 2:
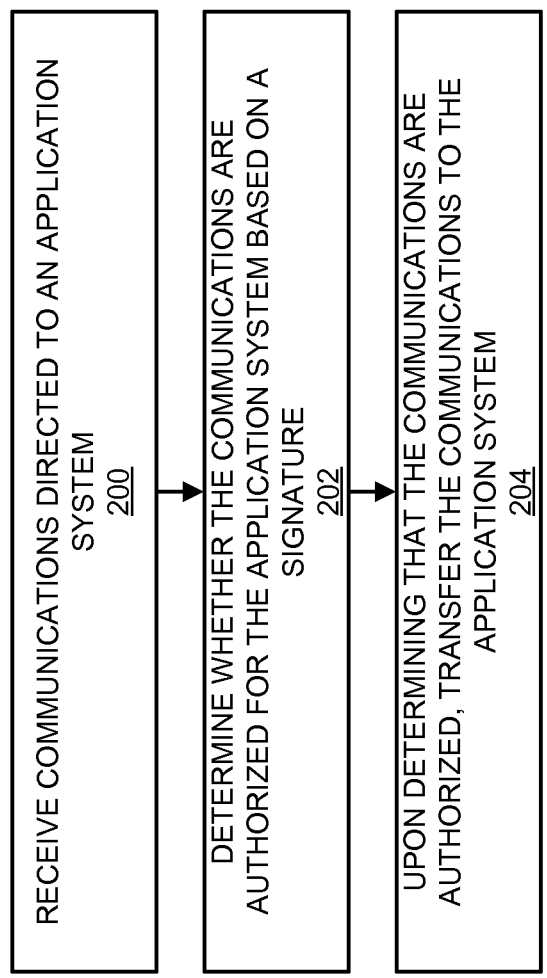
FIG. 2 illustrates an operation of the wireless communication system to provide wireless network application access to a wireless device via an untrusted access node.

FIG. 2 illustrates the operation of wireless communication system 100 to provide wireless network application access to a wireless device via an untrusted access node. Edge node 103 receives communications directed to an application system within wireless network 104 from wireless device 101 via access node 102 external to wireless network 104 (step 200). Access node 102 may be an access node of another wide area wireless communication network or an access node for some other type of wireless network, such as a WIFI router or access point. The communications may be generated by wireless device 101 at the direction of an application, or some other type of software, executing thereon to access an application service provided by the application system. The communications may comprise a request for an application service provided by the application system and/or may include other communications before, during, or after the provision of the service by the application system.

Upon receiving the communications edge node 103 determines whether the communications are authorized for the application system based on a signature included in the communications (step 202). The signature comprises a unique identifier generated at wireless device 101 that corresponds to an identity of wireless device 101 and an identity of an integrated circuit within wireless device 101 that is associated with a subscriber of wireless network 101. The identity of wireless device 101 may be an electronic serial number (ESN) for wireless device 101, a mobile equipment identifier (MEID) for wireless device 101, or any other identifier that uniquely identifies wireless device 101. The integrated circuit may be a subscriber identity module (SIM) or some other type of integrated circuit, either removable or non-removable, that identifies a subscriber of wireless network 104. A subscriber of wireless network 104 may be an individual (e.g. a person having a service plan for wireless network 104), an entity (e.g. a business having one or more service plans for devices to access wireless network 104), or some other means of describing an association with wireless network 104. The integrated circuit may identify the subscriber using an integrated circuit card identifier (ICCID), international mobile subscriber identity (IMSI), an authentication key, or some other form of identification—including combinations thereof.

The signature may be included as a header to data packets that make up the communications to the application system, may be transferred as a message within the communications, or any other way of including a data signature within communications. The signature may comprise the identifiers unaltered or may be generated as a value from the identifiers. For example, the identifiers may be fed as input into a hash function that generates the signature as output. The hash function may be any function that will generate a unique output for each of all possible identifiers used as input. To determine whether the communications are authorized, edge node 103 may have its own copy of the signature, possibly received from another system within wireless network 104, or may generate its own copy of the signature using the same inputs used by the wireless device. Accordingly, in order for edge node 103 to determine that the communications are from a wireless device allowed to access the applications system, the signature included in the communications from wireless device 101 will correspond to an authorized signature at edge node 103.

Upon determining that the communications are authorized, edge node 103 transfers the communications to the application system (step 204). Edge node 103 may transfer the communications to the application system unaltered. In those embodiments, the application may recognize that the communications are from a wireless device allowed to access the application service provided by the application system by virtue of the fact that the communications have been received from edge node 103. Alternatively, edge node 103 may alter the communications to indicate that the communications are from a wireless device that is allowed to access the application service. For example, edge node 103 may include an indicator within the communications, may transfer a distinct message along with the communications to the application system, may change a network address associated with the communications to a trusted network address, or any other possible way of altering communications to provide an indication to another system.

Upon determining that the communications are not authorized (e.g. do not include a signature authorized to access the application system), edge node 103 may discard the communications without transferring the communications to the application system. In some embodiments, edge node 103 may transfer a message back to wireless device 101 indicating that the communications were not allowed to access the application system.

Advantageously, the signatures included in communications destined for an application system from an untrusted access node 102 allows edge node 103 to confirm whether the communications are allowed to access the application system based on both an identity of a wireless device and an identity of an integrated circuit for that device. The two identities are used to generate the signature because there is a lower chance that both identities are fraudulent.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, eNodeB, Internet access node, telephony service node, wireless data access point, or some other wireless communication system—including combinations thereof.

Edge node 103 comprises a computer system and communication interface. Edge node 103 may also include other components such as a router, server, data storage system, and power supply. Edge node 103 may reside in a single device or may be distributed across multiple devices. Edge node 103 could be a network gateway system, service node, or some other communication system—including combinations thereof.

Communication network 104 comprises network elements that provide communications services to wireless devices. Communication network 104 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
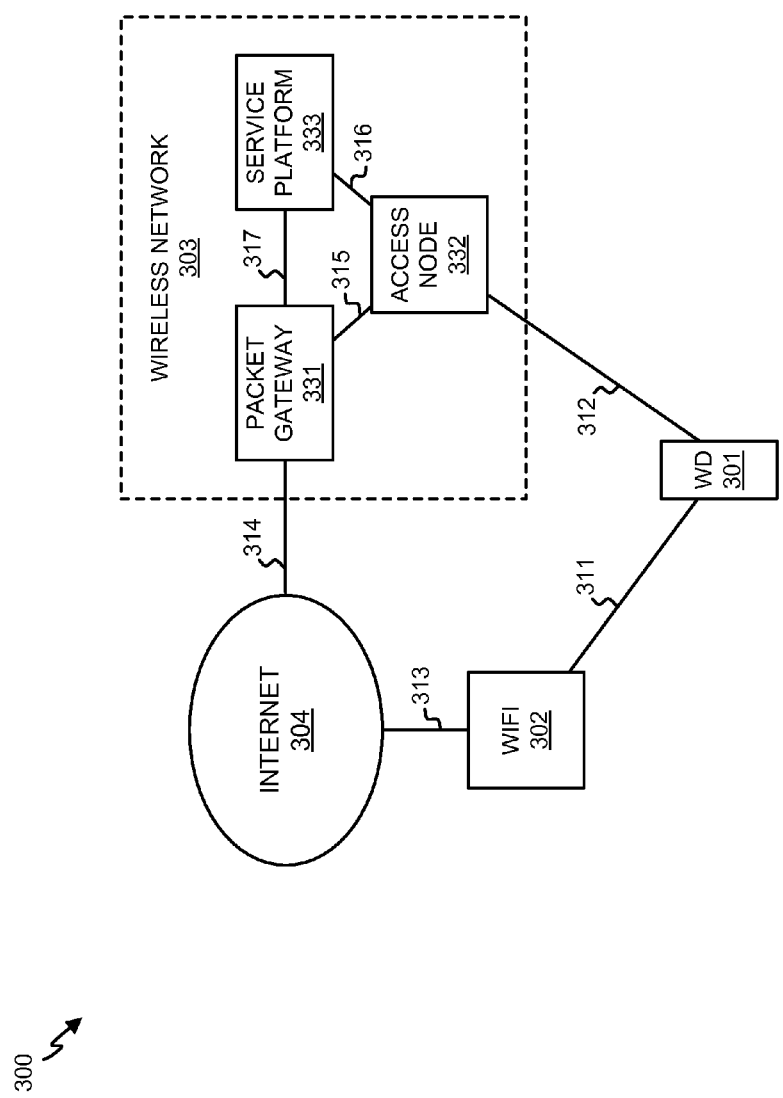
FIG. 3 illustrates a wireless communication system for providing wireless network application access to a wireless device via an untrusted access node.

FIG. 3 illustrates wireless communication system 300. Wireless communication system 300 includes wireless device 301, WIFI access node 302, wireless communication network 303, and Internet 304. Wireless communication network 303 includes packet gateway 331, wireless access node 332, and application service platform 333. Wireless communication device 301 and WIFI access node 302 communicate over wireless link 311. Wireless communication device 301 and wireless access node 332 communicate over wireless link 312. WIFI access node 302 and Internet 304 communicate over communication link 313. Internet 304 and packet gateway 331 communicate over communication link 314. Packet gateway 331 and wireless access node 332 communicate over communication link 315. Wireless access node 332 and application service platform 333 communicate over communication link 316. Packet gateway 331 and application service platform 333 communicate over communication link 317.

In operation, wireless device 301 is allowed to access a service provided by application service platform 333. Wireless device 301 may be allowed to access the service based on a user or owner of wireless device 301 subscribing to a service plan that includes access to the service. Other reasons for wireless device 301 being able to access the service also apply. When attempting to access the service through access node 302, wireless network 333 uses authorization procedures to determine whether wireless device 301 is allowed to access wireless network 303. During these procedures wireless network 303 is also able to determine which services of wireless network 303 that wireless device 301 is allowed to access. Thus, the use of the authorization procedures allows access node 332 to be considered a trusted access node.

However, WIFI node 302 is not an access node within wireless network 303 and is not subject to the authorization procedures for access nodes of wireless network 303. Accordingly, WIFI node 302 is considered an untrusted access node and service platform 333 cannot rely on the fact that communications received via WIFI node 302 are from a device authorized to access the service provided by service platform 333.

Figure 4:
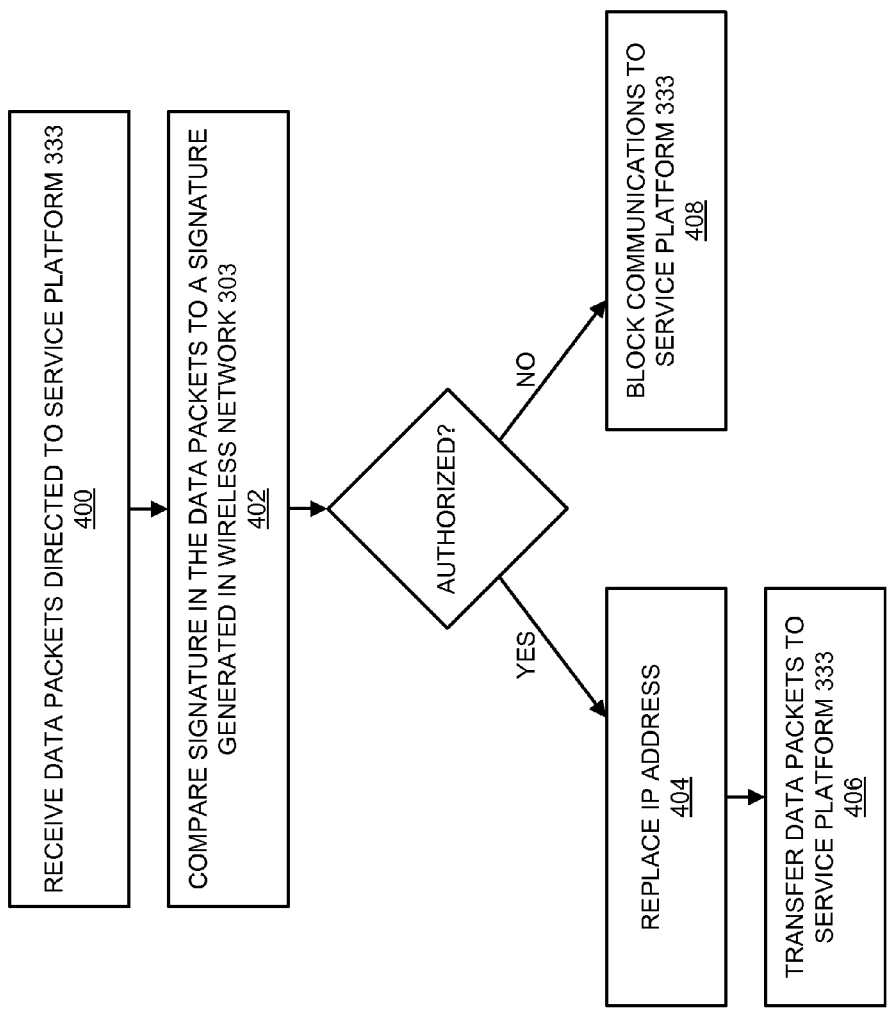
FIG. 4 illustrates an operation of the wireless communication system to provide wireless network application access to a wireless device via an untrusted access node.

FIG. 4 illustrates an operation of wireless communication system 300 to provide wireless network application access to a wireless device via an untrusted access node. Packet gateway 331 receives data packets directed to service platform 333 (step 400). The data packets are received from wireless device 301 by way of WIFI node 302 and Internet 304. Wireless device 301 included a signature within a header of each data packet.

Packet gateway 331 compares the signature in each data packet to signatures for devices that are authorized to access service platform 333 (step 402). The signatures for devices that are authorized to access service platform 333 may be generated at packet gateway 331 or may be received from another system after generation. In this embodiment, the signatures comprise the unique output of a hash function. Both wireless device 301 and whichever element of wireless network 333 generates the authorized signatures use the same hash function. Therefore, when using the same inputs to the hash function, wireless device 301 and the element of wireless network 333 will generate the same hash function output. Accordingly, if wireless device 301 is authorized the signature generated by wireless device 301 will match a signature generated for wireless device 301 at wireless network 333.

Figure 5:
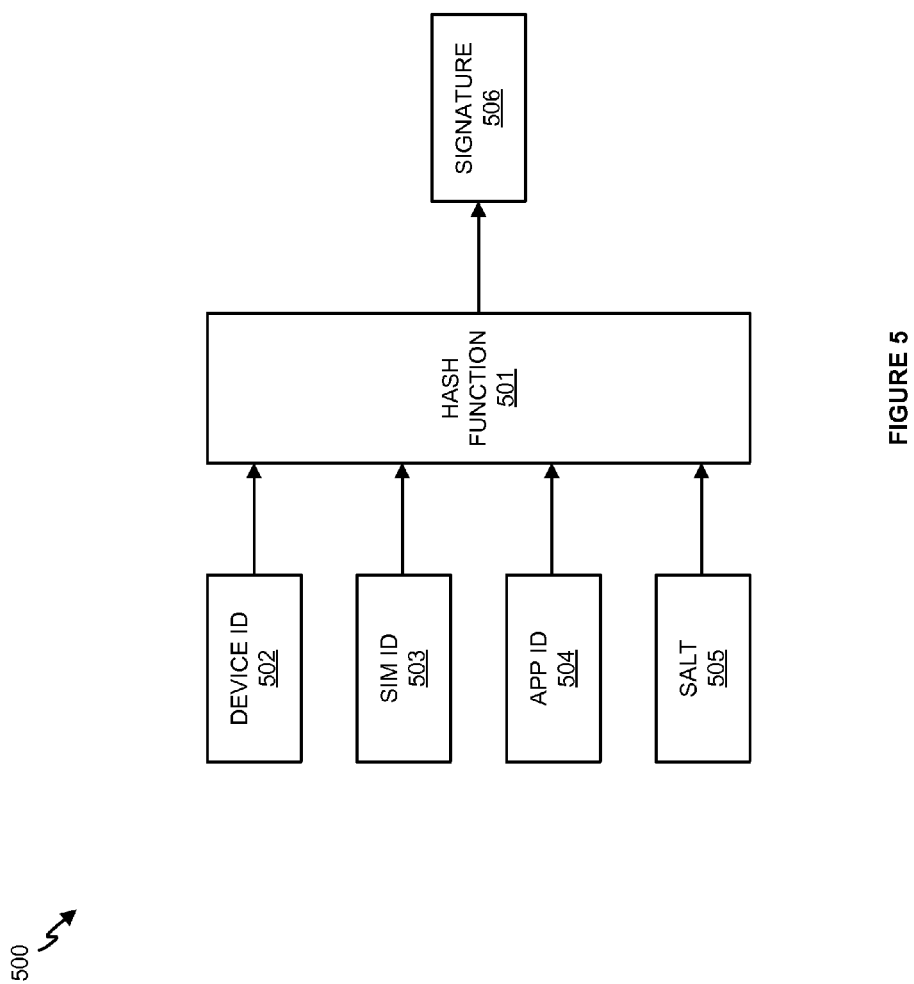
FIG. 5 is a block diagram illustrating the generation of a signature used to provide wireless network application access to a wireless device via an untrusted access node.

FIG. 5 is a block diagram illustrating the generation of a signature using a hash function. In this example, a mobile device ID number 502, a SIM ID number 503, an application ID number 504, and a salt value 505 are fed into hash function 501. The signature 506 for those input values is the output of hash function 501. Hash function 501 comprises any hash function that will output a unique value for each variation of input values. Thus, signature 506 generated for values 502-505 is different than the signature generated if one or more of values 502-505 are changed.

Mobile device ID number 502 may comprise an electronic serial number (ESN) for wireless device 301, a mobile equipment identifier (MEID) for wireless device 301, or any other identifier that uniquely identifies wireless device 301—including combinations thereof. SIM ID number 503 may comprise an integrated circuit card identifier (ICCID), international mobile subscriber identity (IMSI), an authentication key, or some other form of identification—including combinations thereof. Application ID number 504 may be any number known to both wireless device 301 and wireless network 303 representing an application or other type of software executing on wireless device 301 that generates the communications to service platform 333.

Salt 505 is a number known by both wireless device 301 and wireless network 303 that is used to further increase the chances that a fraudulent device attempting to access service platform 333 would not be able to replicate signature 506. In one example, the salt may be a number that is generated during the authentication procedures that occur when wireless device 301 accesses wireless network 303 via access node 332.

Referring back to FIG. 4, if packet gateway 331 determines that the signature included in the headers of the data packets corresponds to a signature authorized to access service platform 333, then packet gateway 331 replaces the IP address indicating the origin of the data packets for each data packet (step 404). Specifically, packet gateway 331 replaces the IP address with an IP address that is trusted by service platform 333. For example, service platform 333 may be configured to recognize a set or range of IP addresses as trusted IP addresses. This range of IP addresses may include addresses given to devices that access wireless network 303 through access node 332. Accordingly, service platform 333 will provide service in response to communications from a trusted IP address regardless of how that trusted IP address was assigned.

After replacing the IP address, packet gateway 331 transfers the data packets on to service platform 333 (step 406).

When responding to the data packets and to provide the application service to wireless device 301, service platform 333 transfers data to the IP address indicated in the received data packets. The IP address is associated with packet gateway 331, which reconciles that IP address with wireless device 301 and directs the data on to wireless device 301.

If packet gateway 331 determines that the signature included in the headers of the data packets does not correspond to a signature authorized to access service platform 333, then packet gateway 331 prevents the data packets from being transferred to service platform 333 (step 408). Packet gateway 331 may simply discard the data packets or may transfer a response to wireless device 301 indicating that communications from wireless device 301 are not allowed access to service platform 333.

Figure 6:
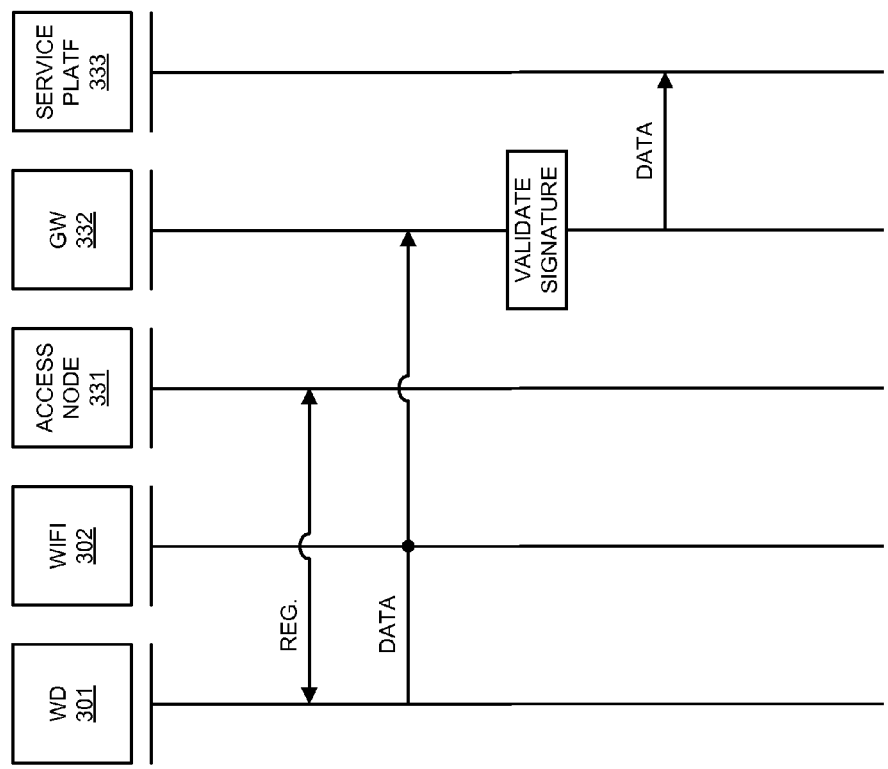
FIG. 6 illustrates an operation of the wireless communication system to provide wireless network application access to a wireless device via an untrusted access node.

FIG. 6 illustrates another operation of wireless communication system 300 to provide wireless network application access to a wireless device via an untrusted access node. In this example, wireless device 301 communicates with both access node 332 and WIFI access node 302. For example, wireless device 301 may exchange some communications (e.g. voice communications) with access node 332 while also exchanging other communications (e.g. data communications) with WIFI access node 302. Alternatively, wireless device 301 may first exchange communications with access node 332 and then exchange communications with WIFI access node 302.

Regardless, to exchange communications with access node 332, wireless device 301 registers with access node 332. An authentication process is performed by access node 332 to determine whether wireless device 301 is allowed to access wireless network 303 and possibly which services of wireless network 303 wireless device 301 is allowed to access. In this example the authentication comprises an ANSI IS-41 authentication process that uses authentication key (A-key) and shared secret data (SSD) information to authenticate wireless device 301 on wireless network 303. The A-key, SSD, or some variation/combination of those values is used in this example as the salt referred to with respect to signature generation in FIG. 5. These values work well as a salt since both network 303 and device 301 are aware of the values after registration in order to use the values for signature generation.

Accordingly, an application or other form of software instructions executing on wireless device 301 generates communications intended for service platform 333 and includes a signature within those communications in accordance with the signature generation process of FIG. 5. Upon receipt of the communications at packet gateway 323, packet gateway 323 checks the signature against signatures for communications from allowed wireless devices to determine whether the communications are authorized for transfer to service platform 333. If the signature within the communications matches a signature allowed to access service platform 333, then packet gateway 323 transfer the communications to service platform 333.

Figure 7:
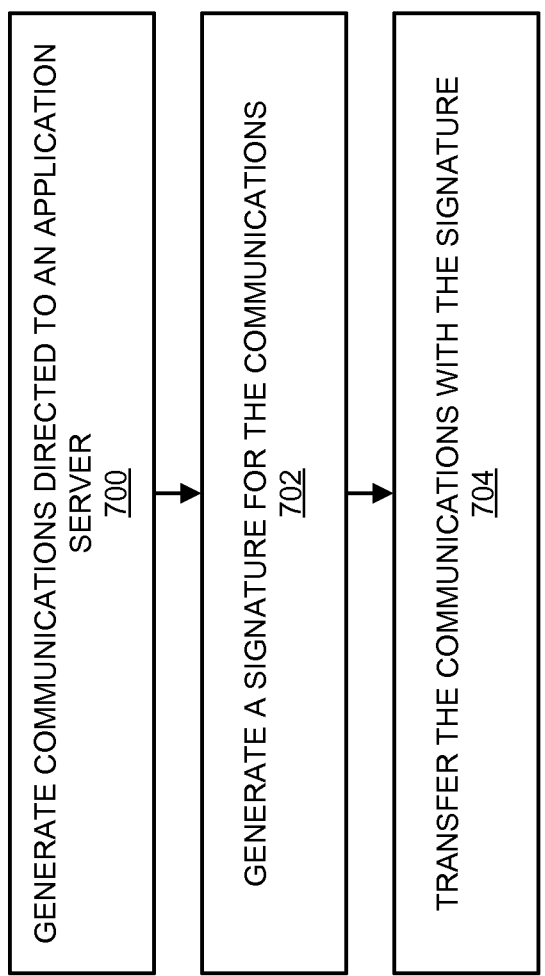
FIG. 7 illustrates an operation of a wireless device to provide wireless network application access to the wireless device via an untrusted access node.

FIG. 7 illustrates an operation of wireless device 301 to provide wireless network application access to wireless device 301 via an untrusted access node. An application or other software executing on wireless device 301 directs wireless device 301 to generate communications directed to service platform 333 (step 700). A signature is also generated for inclusion with the communications when transferred from wireless device 301 (step 702). The signature comprises a unique identifier that corresponds to an identity of wireless device 301 and an identity of an integrated circuit that is associated with a subscriber of wireless network 303.

The application or other software that directed wireless device 301 to generate the communications may also direct wireless device 301 to generate the signature, although, another application or software module executing on wireless device 301 may direct the generation of the signature instead.

After including the signature in the communications, wireless device 301 transfers the communications via WIFI access node 302 (step 704). Packet gateway 332 receives the communications, determines whether the communications are authorized for service platform 333 based on the signature, and transfers the communications to the service platform 333 upon determining that the communications are authorized.

Figure 8:
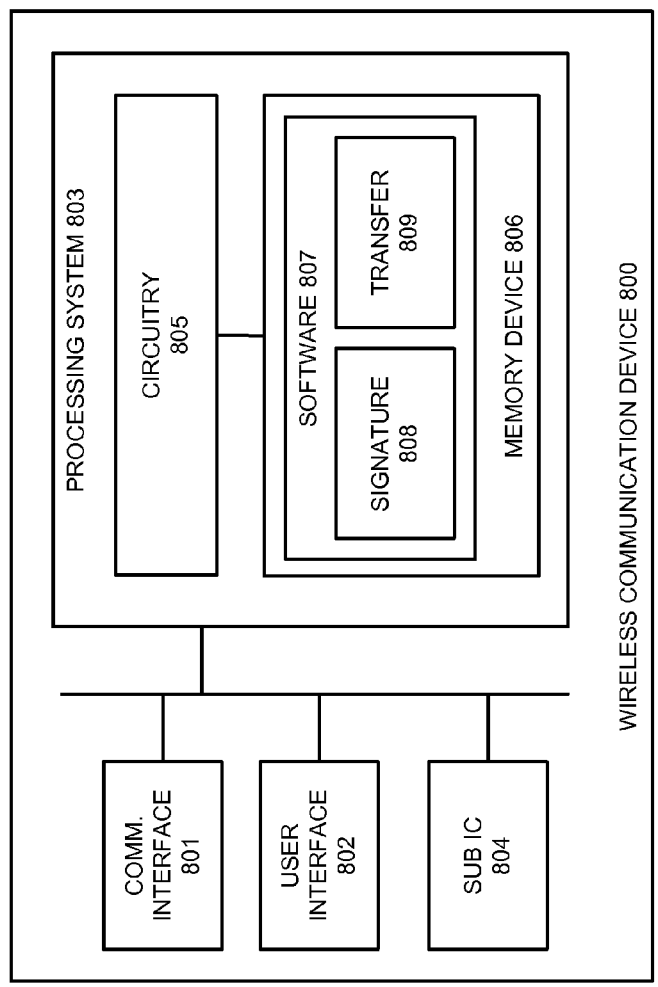
FIG. 8 illustrates a wireless communication device for providing wireless network application access to the wireless device via an untrusted access node.

FIG. 8 illustrates wireless communication device 800. Wireless communication device 800 is an example of wireless communication device 101, although device 101 could use alternative configurations. Wireless communication device 800 comprises wireless communication interface 801, user interface 802, processing system 803, and subscriber integrated circuit (IC) 804. Processing system 803 is linked to wireless communication interface 801 and user interface 802. Processing system 803 includes processing circuitry 805 and memory device 806 that stores operating software 807. Wireless communication device 800 may include other well-known components such as a battery and enclosure that are not shown for clarity. Wireless communication device 800 may be a telephone, computer, e-book, mobile Internet appliance, media player, game console, wireless network interface card, or some other wireless communication apparatus—including combinations thereof.

Wireless communication interface 801 comprises RF communication circuitry and an antenna. The RF communication circuitry typically includes an amplifier, filter, RF modulator, and signal processing circuitry. Wireless communication interface 801 may also include a memory device, software, processing circuitry, or some other communication device. Wireless communication interface 801 may use various protocols, such as CDMA, EVDO, WIMAX, GSM, LTE, WIFI, HSPA, or some other wireless communication format.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may omitted in some examples.

Subscriber IC 804 comprises electronic circuitry configured to store information about a wireless network subscriber. The electronic circuitry may include read only memory, random access memory, flash memory, or any other type of storage media—including combinations thereof. It should be understood that in no case is the electronic circuitry a propagated signal. In some embodiments, subscriber IC 804 is a removable element of wireless communication device 800. For example, subscriber IC 804 may comprise a subscriber identity module (SIM) that stores an international mobile subscriber identity (IMSI) and a related key for use when identifying a subscriber to a wireless network.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes signature generation module 808 and communications transfer module 809. Operating software 807 may include an operating system, utilities, drivers, network interfaces, applications, or some other type of software. When executed by processing circuitry 805, operating software 807 directs processing system 803 to operate wireless communication device 800 as described herein.

In particular, signature generation module 808 directs processing system 803 to generate a signature for inclusion with communications directed to an application system on a wireless communication network, wherein the signature comprises a unique identifier that corresponds to an identity of the wireless communication device and an identity of the subscriber IC 804. Communications transfer module 809 directs processing system 803 to use communication interface 801 to transfer the communications via a wireless access node external to the wireless communication network, wherein an edge node of the wireless communication network receives the communications, determines whether the communications are authorized for the application system based on the signature, and transfers the communications to the application system upon determining that the communications are authorized.

Figure 9:
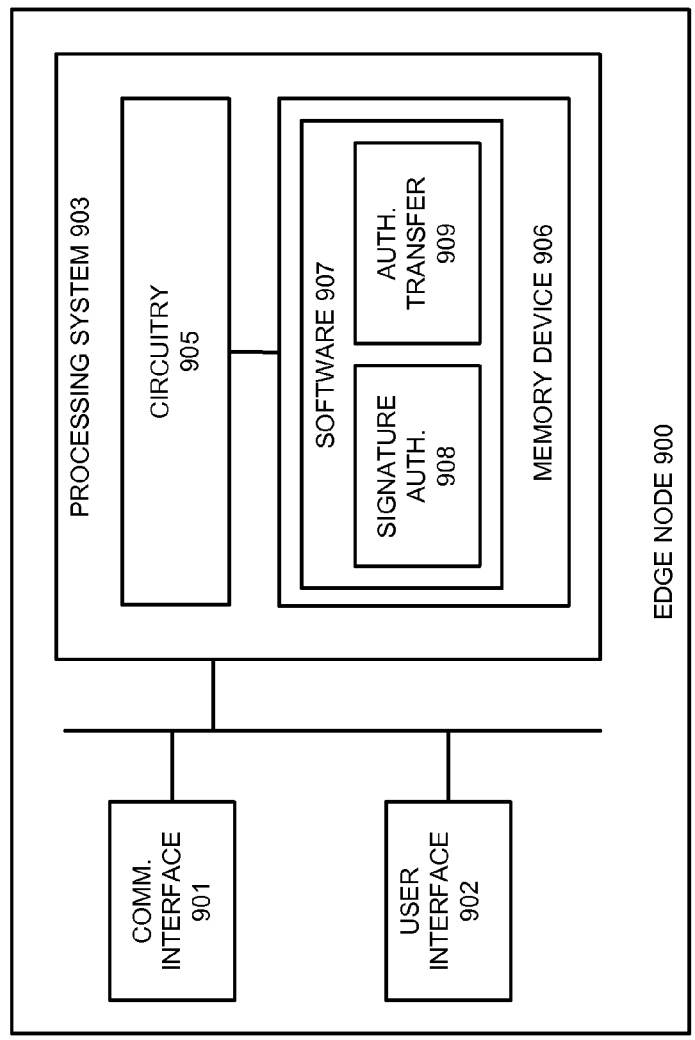
FIG. 9 illustrates a edge node for providing wireless network application access to a wireless device via an untrusted access node.

FIG. 9 illustrates edge node 900. Edge node 900 is an example of edge node 103, although edge node 103 may use alternative configurations. Edge node 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes signature authentication module 908 and authorized transfer module 909. Operating software 907 may further include an operating system, utilities, drivers, network interfaces, applications, or some other type of software. When executed by circuitry 905, operating software 907 directs processing system 903 to operate edge node 900 as described herein.

In particular, operating software 907 directs processing system 903 to use communication interface 901 to receive communications directed to an application system within a wireless communication network from a wireless communication device via a wireless access node external to the wireless communication network. Signature authentication module 908 directs processing system 903 to determine whether the communications are authorized for the application system based on a signature included in the communications, wherein the signature comprises a unique identifier generated at the wireless communication device that corresponds to an identity of the wireless communication device and an identity of an integrated circuit within that wireless communication device that is associated with a subscriber of the wireless communication network. Upon determining that the communications are authorized, authorized transfer module 909 directs processing system 903 to use communication interface 901 to transfer the communications to the application system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to authorize communications, the method comprising:

receiving communications directed to an application system in a wireless communication network from a wireless communication device via an untrusted wireless access node external to the wireless communication network, wherein the application system provides a communications service in the wireless communication network and the wireless communication device has been previously authenticated to access the wireless communication network via a trusted wireless access node;

processing a signature included with the communications to determine when the communications are authorized for the communication service provided by the application system, wherein the communications comprise a plurality of data packets and the signature is included in a header of the data packets, the signature comprising a unique identifier generated at the wireless communication device corresponding to an identity of the wireless communication device and an identity of an integrated circuit within the wireless communication device that is associated with a subscriber of the wireless communication network; and when the communications are authorized for the communication service, replacing an IP address associated with the data packets with a private IP address that is trusted by the wireless communication network and transferring the communications to the application system.

2. The method of claim 1, wherein the communications are authorized when the signature indicates that the communications are transferred from an authorized wireless communication device having an authorized integrated circuit therein.

3. The method of claim 1, wherein the unique identifier comprises an output of a hash function using, as inputs, at least a device identifier for the wireless communication device, an identifier for the integrated circuit, and an application identifier that identifies an application associated with the communications.

4. The method of claim 3, wherein the integrated circuit comprises a subscriber identity module (SIM).

5. The method of claim 3, wherein the hash function further uses an authentication key (A-key) and shared secret data (SSD) information as input.

6. The method of claim 5, wherein the A-key and SSD information is obtained from an ANSI IS-41 authentication of the wireless communication device.

7. The method of claim 1, wherein, when the communications are authorized for the communication service, the application system treats the communications as though the communications were received via an access node of the wireless communication network.

8. A wireless communication system, comprising:
a communication interface including electronic circuitry configured to receive communications directed to an application system within a wireless communication network from a wireless communication device via an untrusted wireless access node external to the wireless communication network, wherein the application system provides a communications service in the wireless communication network and the wireless communication device has been previously authenticated to access the wireless communication network via a trusted wireless access node;
a processing system configured to determine when the communications are authorized for the communication service provided by the application system based on a signature included with the communications, wherein the communications comprise a plurality of data packets and the signature is included in a header of the data packets, the signature comprising a unique identifier generated at the wireless communication device that corresponds to an identity of the wireless communication device and an identity of an integrated circuit within the wireless communication device that is associated with a subscriber of the wireless communication network, and when the communications are authorized for the communication service, replace an IP address associated with the data packets with a private IP address that is trusted by the wireless communication network; and
the communication interface further configured to transfer the communications to the application system when the communications are authorized for the communication service.

9. The wireless communication system of claim 8, wherein the communications are authorized when the signature indicates that the communications are transferred from an authorized wireless communication device having an authorized integrated circuit therein.

10. The wireless communication system of claim 8, wherein the unique identifier comprises an output of a hash function using, as inputs, at least a device identifier for the wireless communication device, an identifier for the integrated circuit, and an application identifier that identifies an application associated with the communications.

11. The wireless communication system of claim 10, wherein the integrated circuit comprises a subscriber identity module (SIM).

12. The wireless communication system of claim 10, wherein the hash function further uses an authentication key (A-key) and shared secret data (SSD) information as input.

13. The wireless communication system of claim 12, wherein the A-key and SSD information is obtained from an ANSI IS-41 authentication of the wireless communication device.

14. The wireless communication system of claim 8, wherein, when the communications are authorized for the communication service, the application system treats the communications as though the communications were received via an access node of the wireless communication network.

15. A wireless communication device, comprising:
an integrated circuit that is associated with a subscriber of a wireless communication network;
a processing system configured to generate a signature for inclusion with communications directed to an application system that provides a communications service on a wireless communication network, wherein the communications comprise a plurality of data packets and the signature is included in a header of the data packets, the signature comprising a unique identifier that corresponds to an identity of the wireless communication device and an identity of the integrated circuit, and wherein the wireless communication device has been previously authenticated to access the wireless communication network via a trusted wireless access node;
a communication interface configured to transfer the communications via an untrusted wireless access node external to the wireless communication network, wherein an edge node of the wireless communication network receives the communications, determines whether the communications are authorized for the application system based on the signature, and when the communications are authorized, replaces an IP address associated with the data packets with a private IP address that is trusted by the wireless communication network when the communications are authorized and transfers the communications to the application system.

16. The wireless communication device of claim 15, wherein the communications are authorized when the signature indicates that the communications are transferred from an authorized wireless communication device having an authorized integrated circuit therein.

* * * * *